(12) United States Patent
Ghosh

(10) Patent No.: US 9,890,768 B2
(45) Date of Patent: Feb. 13, 2018

(54) HYBRID VERTICAL AXIS WIND TURBINE

(71) Applicant: Anjik Ghosh, Albuquerque, NM (US)

(72) Inventor: Anjik Ghosh, Albuquerque, NM (US)

(73) Assignee: Anjik Ghosh, Albuquerque, NM (US)

( * ) Notice: Subject to any disclaimer, the term of this patent is extended or adjusted under 35 U.S.C. 154(b) by 0 days.

(21) Appl. No.: 14/940,022

(22) Filed: Nov. 12, 2015

(65) Prior Publication Data

US 2016/0138568 A1 May 19, 2016

Related U.S. Application Data

(63) Continuation of application No. 13/914,630, filed on Jun. 11, 2013, now abandoned.

(51) Int. Cl.

| | | |
|---|---|---|
| *F03D 9/00* | (2016.01) | |
| *F03D 3/06* | (2006.01) | |
| *F03D 3/00* | (2006.01) | |
| *F03D 9/25* | (2016.01) | |
| *F03D 13/20* | (2016.01) | |
| *F03D 80/70* | (2016.01) | |
| *H02K 3/04* | (2006.01) | |
| *H02K 7/08* | (2006.01) | |
| *H02K 7/18* | (2006.01) | |

(52) U.S. Cl.
CPC .............. *F03D 9/002* (2013.01); *F03D 3/005* (2013.01); *F03D 3/061* (2013.01); *F03D 3/062* (2013.01); *F03D 9/25* (2016.05); *F03D 13/22* (2016.05); *F03D 80/70* (2016.05); *H02K 3/04* (2013.01); *H02K 7/08* (2013.01); *H02K 7/183* (2013.01); *Y02B 10/30* (2013.01); *Y02E 10/74* (2013.01)

(58) Field of Classification Search
CPC ........ Y02E 10/74; Y02E 10/725; Y02E 10/72
USPC ....................... 290/44, 55; 415/4.2
See application file for complete search history.

(56) References Cited

U.S. PATENT DOCUMENTS

| | | | | |
|---|---|---|---|---|
| 6,948,905 | B2 * | 9/2005 | Horjus | F03D 3/02 415/4.2 |
| 7,849,596 | B2 * | 12/2010 | Sauer | B23P 15/006 29/889.7 |
| 8,550,786 | B2 * | 10/2013 | Janiuk | F03D 3/061 415/4.2 |
| 2007/0224029 | A1 * | 9/2007 | Yokoi | F03D 3/005 415/4.2 |
| 2008/0203731 | A1 * | 8/2008 | Dulcetti Filho | F03D 3/02 290/44 |

(Continued)

*Primary Examiner* — Julio Gonzalez
*Assistant Examiner* — Charles Reid, Jr.

(57) ABSTRACT

A hybrid vertical axis wind turbine using a highly aerodynamic blade-profile is disclosed. The blade-profile is simple, asymmetrical with unequal upper and lower surfaces cambers and is capable of generating high starting torque even at low wind. Wind tunnel tests demonstrated that this aerodynamic profile would generate high torque of similar magnitude when wind comes from leading or trailing edge. Other characteristics of this profile are that it is compact, lightweight, durable and economical. The target users for this patent will be 44% of the world population that live in rural areas where roof-top wind turbine will be cost effective to provide enough household required electric power. This compact turbine can also use batteries to store energy, thereby reducing and possibly eliminating the need for grid power.

12 Claims, 13 Drawing Sheets

(56) References Cited

U.S. PATENT DOCUMENTS

| | | | |
|---|---|---|---|
| 2009/0102194 A1* | 4/2009 | M' Ariza Garcia San Miguel | F03D 3/061 290/44 |
| 2009/0140528 A1* | 6/2009 | Ireland | F03D 3/065 290/55 |
| 2009/0184521 A1* | 7/2009 | Chong | F03D 3/049 290/55 |
| 2010/0209250 A1* | 8/2010 | Deeley | F03D 3/068 416/131 |
| 2010/0232965 A1* | 9/2010 | Chang | F03D 3/064 416/169 R |
| 2011/0298214 A1* | 12/2011 | Thompson | F03D 3/02 290/44 |
| 2013/0049373 A1* | 2/2013 | Lee | F03D 9/002 290/55 |

* cited by examiner

HYBRID VERTICAL AXIS WIND TURBINE

REFERENCE TO RELATED APPLICATION

This application is a continuing application of parent application Ser. No. 13/914,630 filed on Jun. 11, 2013 of Anjik Ghosh for Hybrid Vertical Axis Wind Turbine.

BACKGROUND OF THE INVENTION

1. Field of the Invention

The present invention relates to a hybrid vertical axis wind turbine using a highly aerodynamic blade-profile capable of providing high starting torque even at low wind speeds. The blade profile is simple to construct, lightweight and asymmetrical with unequal upper and lower surface cambers.

2. Description of the Prior Art

Most industry standard centralized wind farms use horizontal axis wind turbines (HAWTs) to harness energy from blowing wind. HAWTs are often placed far from utility location (i.e. market) where unobstructed wind is available. Construction of transmission lines and infrastructure along with transmission losses amount to large loses in revenue. To accept wind from any direction, HAWTs are equipped with various controls, which need external electrical power to run. Based on Betz's law, the efficiency of a HAWT can be at most 59%. These are a few of the shortcomings of centralized HAWTs.

An alternative to industry standard centralized wind farms is a de-centralized system that is designed to function at low altitudes close to residential establishments or on rooftops. Wind at low altitudes travel at low speeds and are affected by trees, buildings and other surrounding obstacles, causing the flow to be scattered and turbulent. HAWTs fail to provide economical solutions to harness power from low speeds and scattered winds. VAWTs can accept wind from any direction and thus will perform more efficiently in an environment characterized by scattered wind. Most VAWTs are either Savonius type or Darrieus type.

The deficiency of a VAWT is that it is incapable of generating high starting torque. As a result, under low wind, hardly any electrical power can be generated. Different methods were tried by researchers to overcome this deficiency by adding an electric motor to provide the starting torque, or by incorporating a relatively inexpensive variable pitch device for the blades or by adding a Savonius rotor to the central supporting shaft.

A Hybrid Savonius-Darrieus VAWT has many advantages over a pure Savonius or pure Darrieus turbine. Out of many arrangements, one arrangement is based on placing a Savonius rotor on the central shaft of a Darrieus type VAWT. Such type of VAWT system has the potential to achieve reasonable amount of torque but will involve high cost to manufacture.

U.S. Patent Number 2007/0224029 A1 describes a starting mechanism system for a lift type vertical axis wind turbine using blades with asymmetrical airfoil cross section that can rotate at high speed after starting to rotate. Blades have airfoil shaped cut outs at their lower surfaces. Geometry as well as the location of the cut out is empirically provided in terms of maximum thickness of the blade and chord length. This vertical axis wind turbine has an electric power generator mounted at top of the supporting pole.

The airfoil with a cut out is complex in design that will result in high degree of difficulty in the production and thus will be very expensive commercially. A sudden cutout will also cause stress concentration at the cutout starting location thereby decreasing the fatigue life and increasing the overall life cycle cost. The reattachment of the boundary layer after the cut out will take place without causing any distress to the profile is not demonstrated. The placement of the power generator at the top of the pole will reduce the overall stability of the system.

U.S. Pat. No. 4,430,044 discloses a vertical axis wind turbine comprising blade forms mounted for limited pivotal movement. Turbine blades have symmetrical profile along with a torque sensitive control means to progressively limit the pivotal movement of the blade. The turbine is capable of self-starting and accelerating to a high rotational speed for maximum power generation. This turbine is capable of generating power at wind current velocities ranging from 5 to 40 miles per hour. The two-blade turbine has low solidity ratio. Blades are mounted on lightweight structure.

This lift type wind machine has the inherent deficiency of a common vertical axis wind turbine i.e. will not self start at low wind speed. Symmetrical profile has no path difference between top and bottom surfaces. It is not possible to generate enough torque to start this turbine. This airfoil would have little value added with the use of such equipment, which may explain why it has not been adopted for large-scale use.

U.S. Pat. No. 8,096,773 B2 discloses an invention of a vertical axis wind turbine with a rotating shaft and multiple symmetrical blades being connected to and disposed around the rotating shaft for optimized balance.

Deficiency of this invention is the same as that of U.S. Pat. No. 4,430,044. This invention is based on symmetrical blade with no control mechanism for pitch control. Thus, this design will not be able to generate enough starting torque to rotate.

U.S. Pat. No. 8,096,773 discloses an invention of a vertical axis wind turbine where the horizontal support beams housing the blades and the blades are described as the following, "The blades and struts have luff and lee edges. The luff edge tapers toward the lee edge for improved aerodynamics."

This invention uses an aerodynamic horizontal strut, minimizing the drag force generated by the horizontal struts.

U.S. Pat. No. 4,430,044 discloses an invention of a vertical axis wind turbine where the horizontal beams are described, "At an upper end of the shaft is connected to a hub to which a pair of aerodynamically shaped rotors are mounted for rotational movement."

Deficiency of this invention is the same as that of U.S. Pat. No. 8,096,773. The horizontal mounts to the hubs are aerodynamic and cannot provide a drag force.

SUMMARY OF THE INVENTION

The present invention relates to a hybrid vertical axis wind turbine using a highly aerodynamic blade-profile capable of providing high starting torque even at low wind speeds. The blade-profile is simple to construct, asymmetrical with unequal upper and lower surface cambers. Other characteristics of this profile are that it is compact, lightweight, durable and economical. The vertical rotating shaft extends down the length of the wind turbine. There are two horizontal channel beams that support each blade, one on top of the blade and the other underneath. The channels with compartments will act similar to the way that a Savonius type VAWT works and will generate some torque that will be complemented by the torque generated by lift forces from the blades. Wind tunnel tests demonstrated that this aerodynamic profile would generate high torque of similar magnitude when wind comes from leading or trailing edge. The primary target users will be the 44% of the world population that live in rural areas where roof-top wind turbine will be cost effective to provide enough household required electric power. This compact turbine can use batteries to store energy, thereby reducing and possibly eliminating the need for grid power.

It is therefore a primary object of the present invention to provide a design of the profile that significantly enhances the performance of the blade even when wind is scattered and low speed.

It is another object of the present invention to provide a profile that is not complex so that the manufacturing cost is low.

It is a further object of the present invention to provide a profile that will be lightweight and durable. This will ensure a low cost for the supporting structures including foundation on which the wind turbine is supported, resulting in a low life-cycle cost.

It is another object of the present invention to stabilize the vertical axis wind turbine by providing the power generation and storage units at the bottom of the turbine.

These and other objects of the present invention will become apparent to those skilled in this art upon reading the accompanying description, drawings, and claims set forth herein.

DETAILED DESCRIPTION OF THE INVENTION

1. Definitions

A Savonius type VAWT as used here are primarily drag type devices in which thrust produced in the wind collectors being pushed downwind is higher than the drag generated by the other collectors travelling upwind. As a result, a net trust is resulted that causes turbine to rotate. Betz's research indicated that for an airfoil operating on drag concept, only about 15% of the available energy from wind can be harnessed.

A Darrieus type VAWT is a wind turbine where a number of blades are used that produce lift force to generate electricity. In order to get higher lift force, the path difference between top and bottom streamlines should be as large as possible. The other factor that will influence the magnitude of the lift force is how smoothly the path difference is created. It is also possible to have a profile with large path difference between top and bottom surfaces and still can generate low lift forces. Wind tunnel tests were performed to determine the magnitude of lift force when blades meet wind at different angles of attack. Test observations are provided in the example. According to Betz's research, airfoils operating on lift concept could harness as high as 60% of the available wind energy, which can be higher than that of most efficient HAWT.

A hybrid Savonius-Darrieus VAWT will have both lift and drag producing components.

Solidity ratio is the ratio of total rotor plan form area to total swept area. This is a term used in the case of a HAWT. Generally, low solidity, (say 0.1) refers to a high blade speed and low torque output, and high solidity, (say 0.8) refers to low blade speed and high torque designs.

2. Best Mode of the Invention

Figure 1:
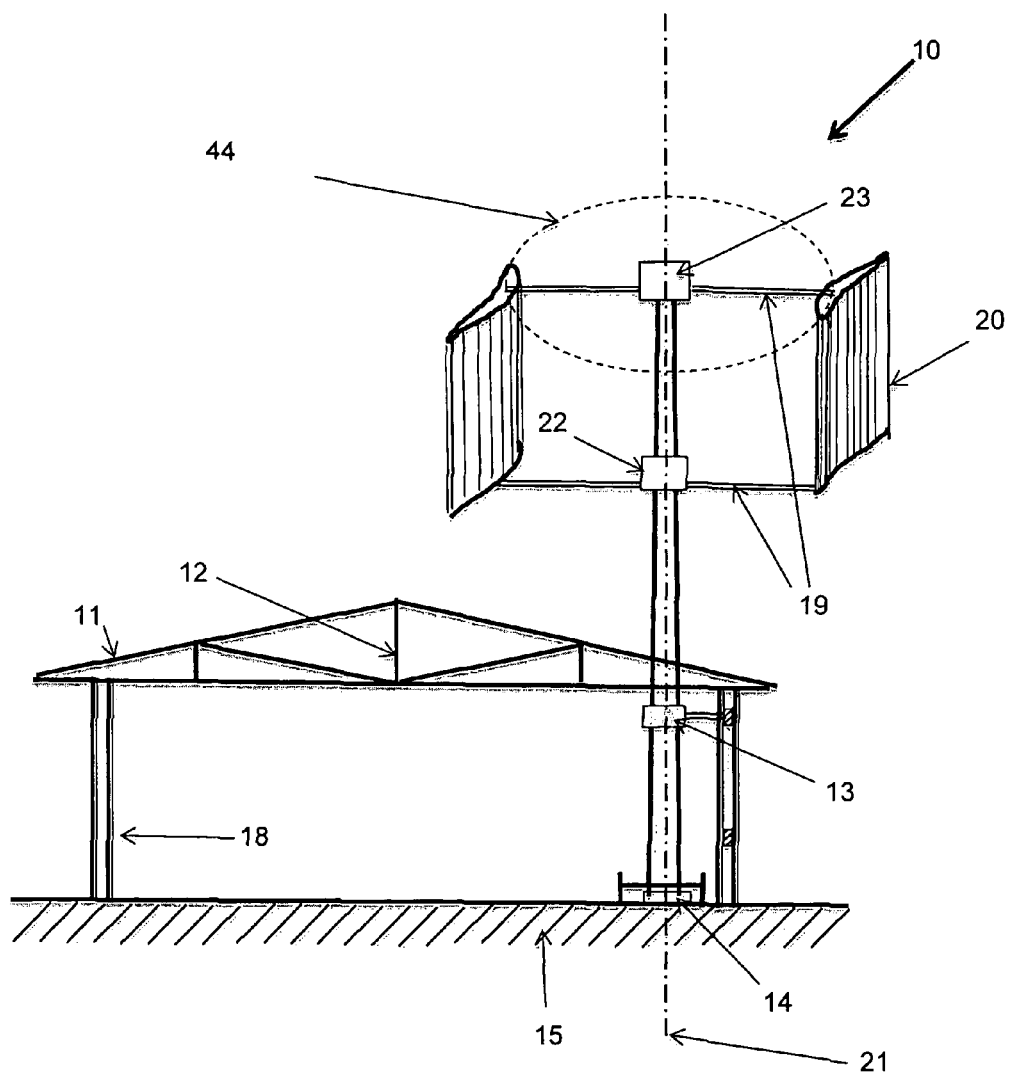
FIG. 1 is an external perspective view of the vertical axis wind turbine comprising of one or more blades using a simple, asymmetrical blade-profile with unequal upper and lower surface cambers enclosed in this invention.

FIG. 1 shows a external perspective view of the best mode contemplated by the inventor of the hybrid vertical axis wind turbine 10 according to the concepts of the present invention.

3. How to Make the Invention

Figure 2:
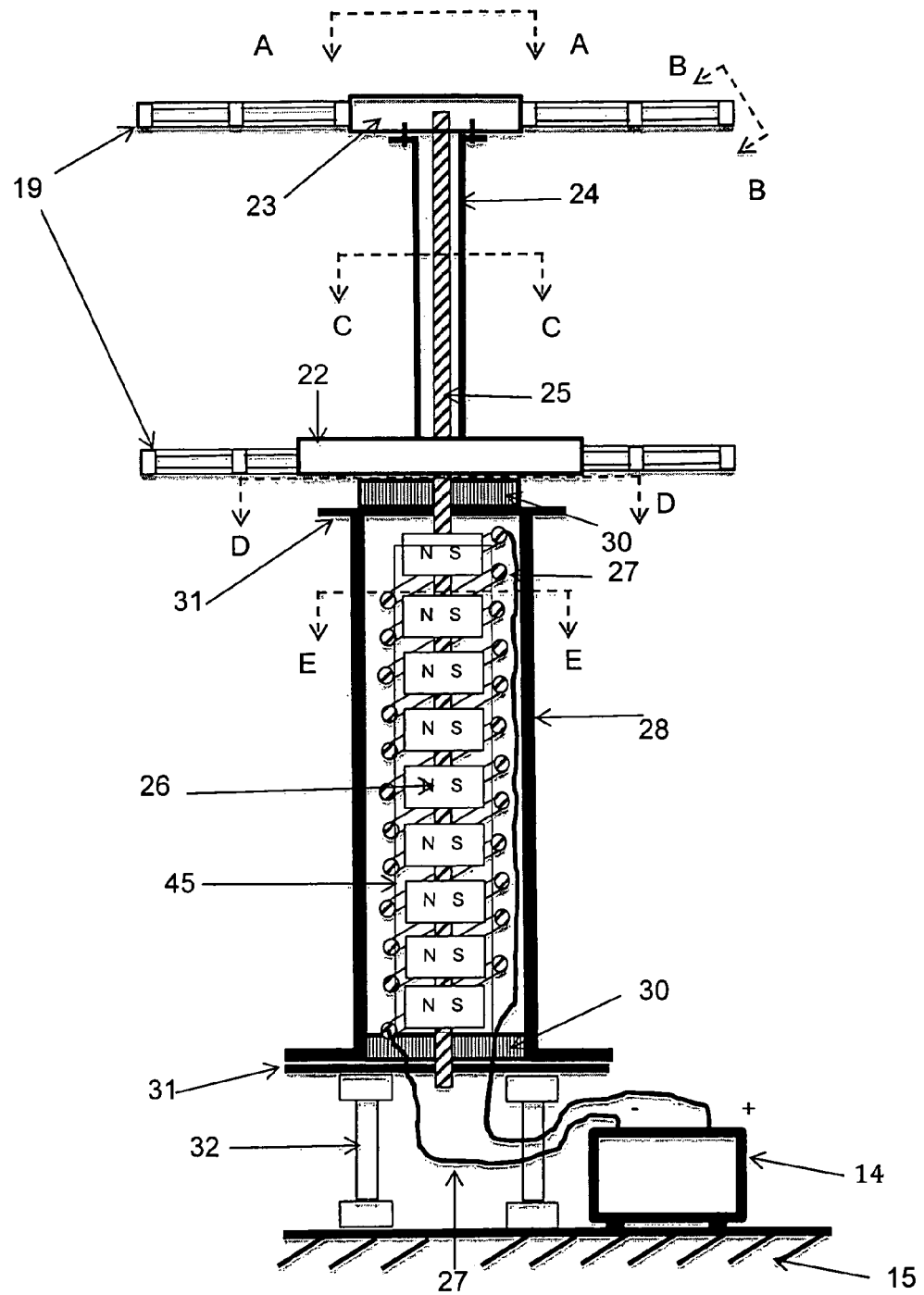
FIG. 2 is vertical cross section of the turbine shaft. Cross section is taken through its diameter.
Figure 2A:
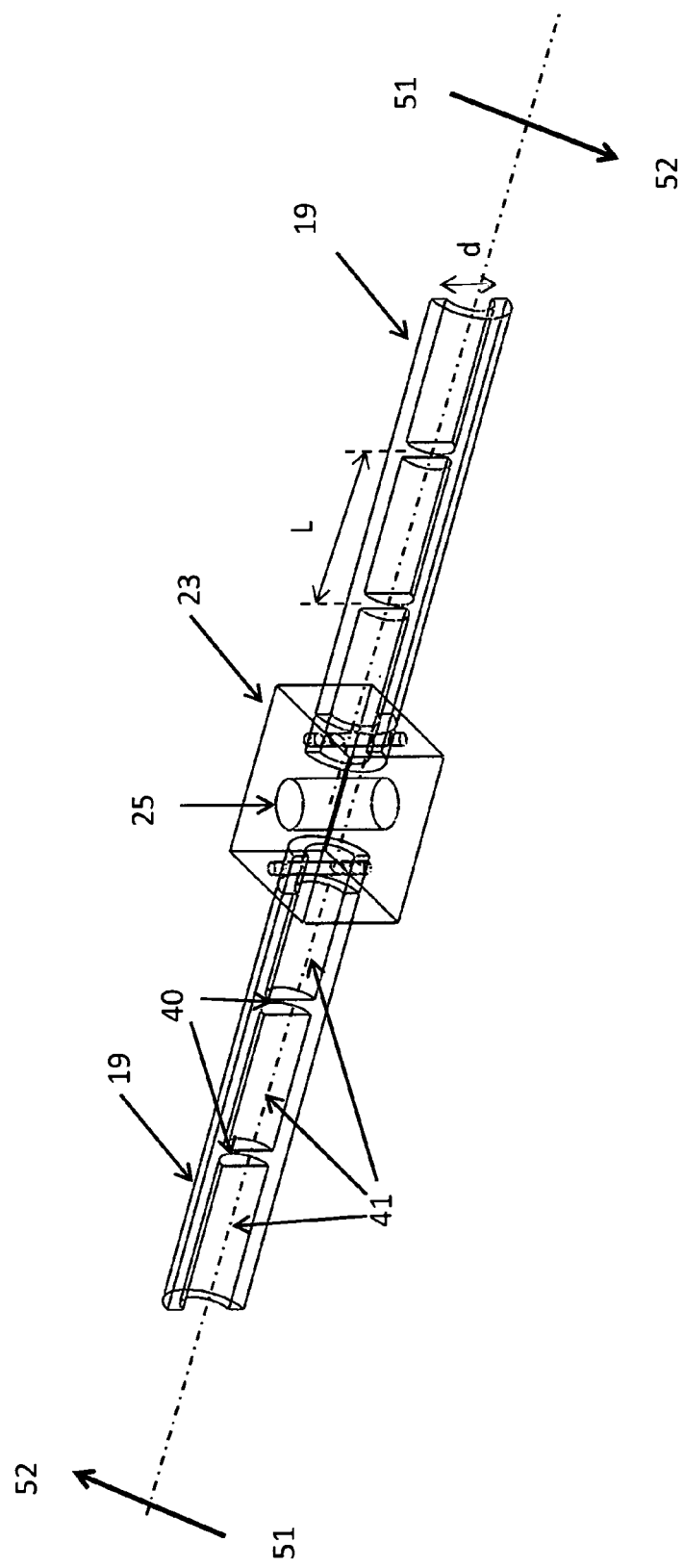
FIG. 2a is a three-dimensional view of the horizontal beams and how they connect to the upper or lower hubs. The far-end of the horizontal beams extend to connect to the blades (not shown). The horizontal beams have a streamline profile and a concavity, which faces the leading edge and trailing edge of the blade it is connected to, respectively.
Figure 2B:
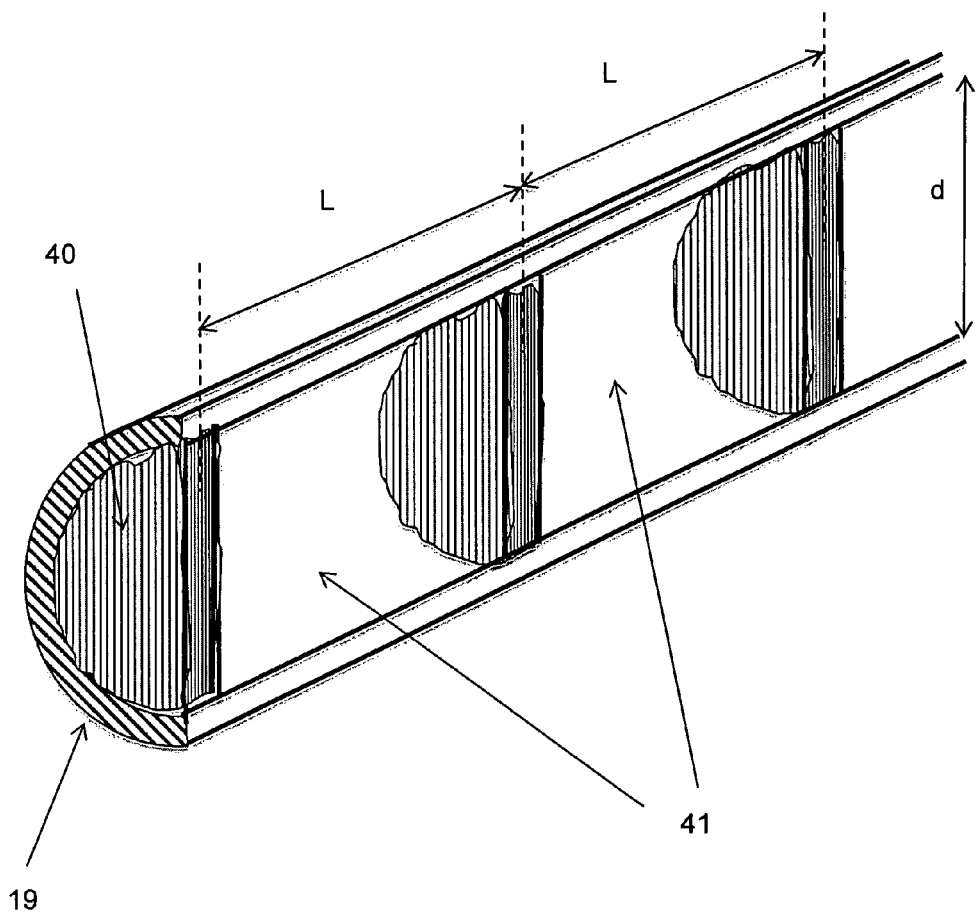
FIG. 2b is a perspective view of the horizontal member that supports the blade of present invention along B-B as shown in FIG. 2.
Figure 2C:
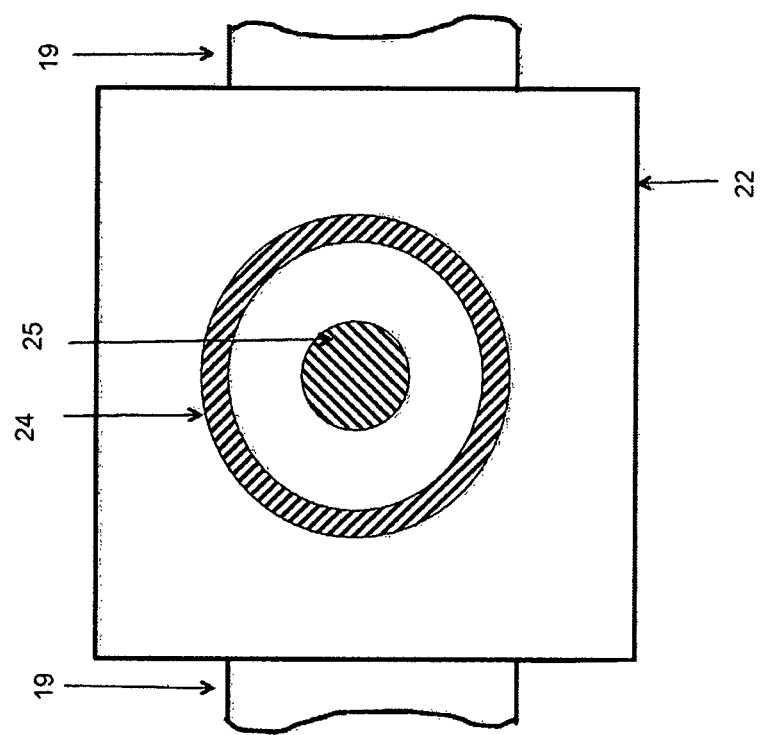
FIG. 2c is another sectional view of the vertical axis along C-C as shown in FIG. 2.
Figure 2D:
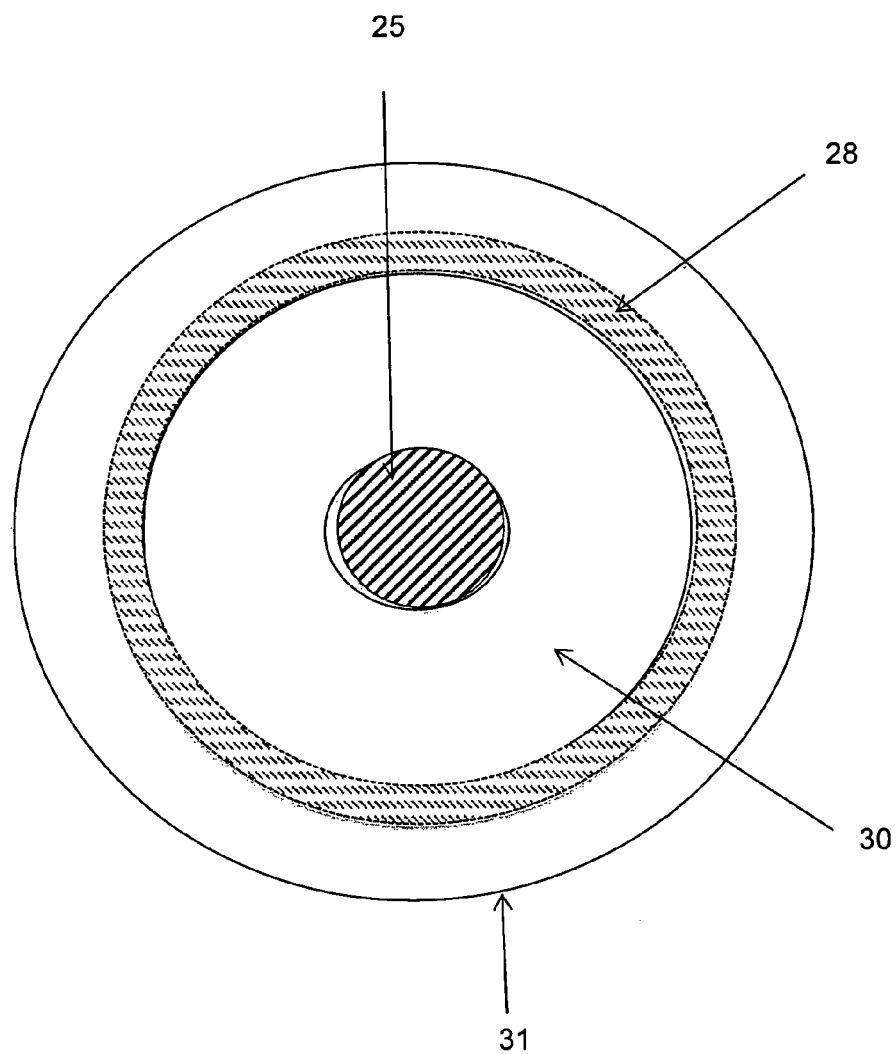
FIG. 2d is another sectional view of the vertical axis along D-D as shown in FIG. 2.

Referring now to the drawings in detail, the hybrid vertical axis wind turbine of the present application, which is designated generally by the reference number 10, comprises of a vertical rotating shaft 25, at the center of the system. Any material can be used to construct this shaft so long as the stress and deflection due to highest wind is considered in the design. This vertical rotating shaft will support most of the elements needed to harness energy from the blowing wind. FIG. 1 gives the external perspective view of the vertical axis wind turbine. The turbine can be erected as a stand-alone system or it can be connected to the structural framework comprises of elements marked as 11, 12, 13, 18 as shown in FIG. 1. The primary reason for connecting the shaft with the building framework is to make the system stable. When wind strikes the turbine, the shaft should not bend so much that its free rotation is disturbed by the adjacent elements. FIG. 2 shows the sectional view of the turbine by a vertical plane passing through the diameter. Upper outer shaft 24, is provided to protect the vertical rotating shaft from external damage. FIG. 2*c* shows the cross sectional view of the vertical rotating shaft taken along C-C of FIG. 2.

The top most element that is connected to the vertical rotating shaft is the upper hub 23, which is rigidly connected to the vertical rotating shaft, 25. The connection between the shaft 25 and the top hub 23 is shown in FIG. 2. All the diagrams correspond to a system with two blades located diametrically opposite. Thus, for the situation where only two blades are present, a square/rectangular hub can be used. When there are three or more blades, the plan form of the hub will be in the shape of a regular polygon with number of sides that can be decided on the basis of convenience. The thickness of the hub will be such that it can accommodate the horizontal beams, 19. The midpoint of the horizontal beam diameter should align with the center of the hub face so that the horizontal beams and hub have an axis 41 through them.

The horizontal beam 19, has a streamline profile facing the leading edge of the blade, and a concavity facing the trailing edge of the blade. Thus they will be called as channel beam for this application. The channel beam has to perform two very specific tasks: (a) supports the blade so that it is structurally sound in withstanding the stress due to wind and (b) to develop net drag forces along the direction of the leading edge of the blade when the concave face of the beam is facing the wind. The channel beam will be responsible for generating some torque even at very low wind. Close up view of the front view of the beam is shown in FIG. 2*b*. Semicircular plates 40, with diameter "d" as shown in FIG. 2*b* are fixed using any means to create the compartments. Channel beams 19, should be so fabricated that there is no gap between the inner surface of the longitudinal channel and the compartment plates, 40. The spacing L, as shown in FIG. 2 *b* is a design issue.

Figure 3:
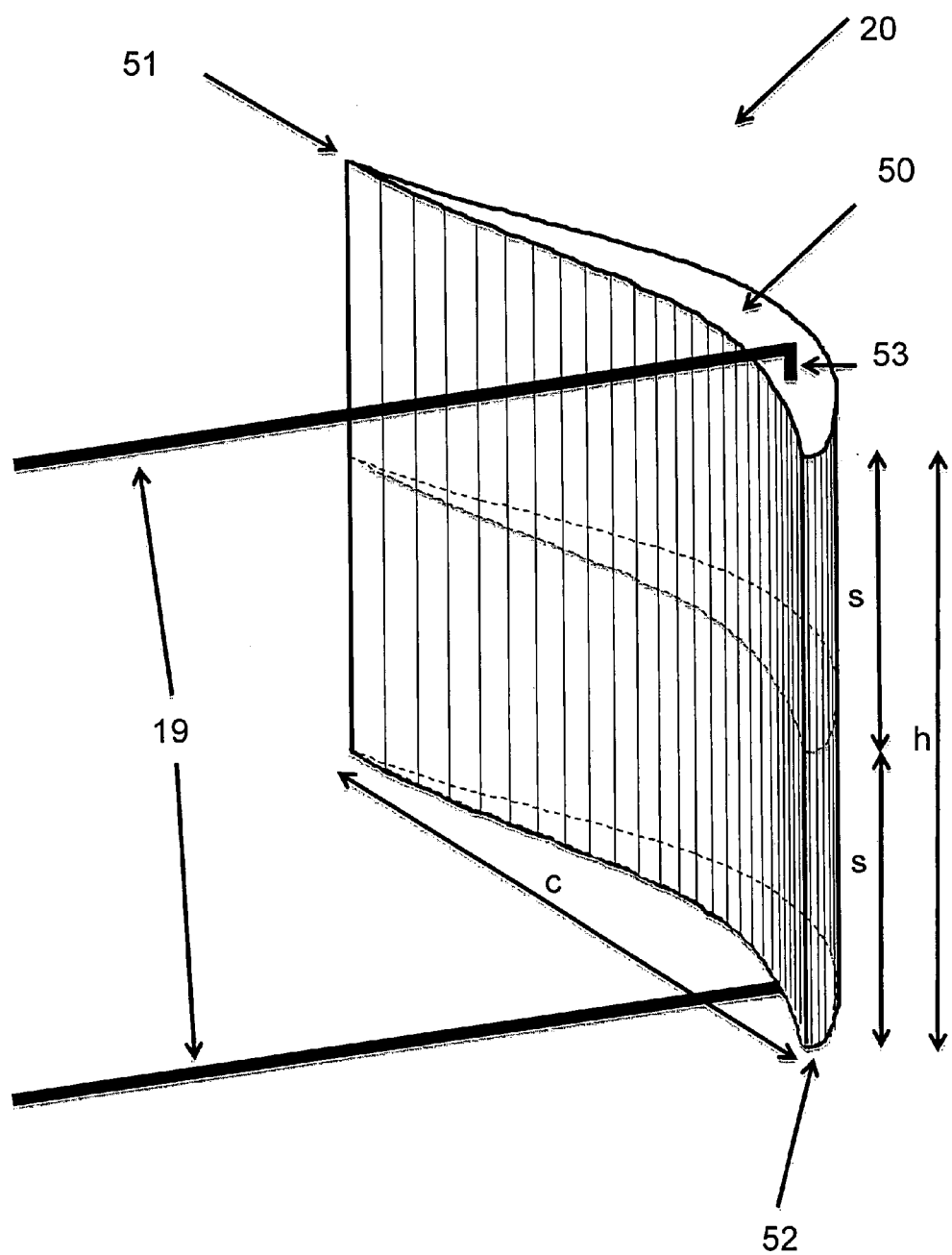
FIG. 3 is a close up view of a blade along with the connecting beams.
Figure 4:
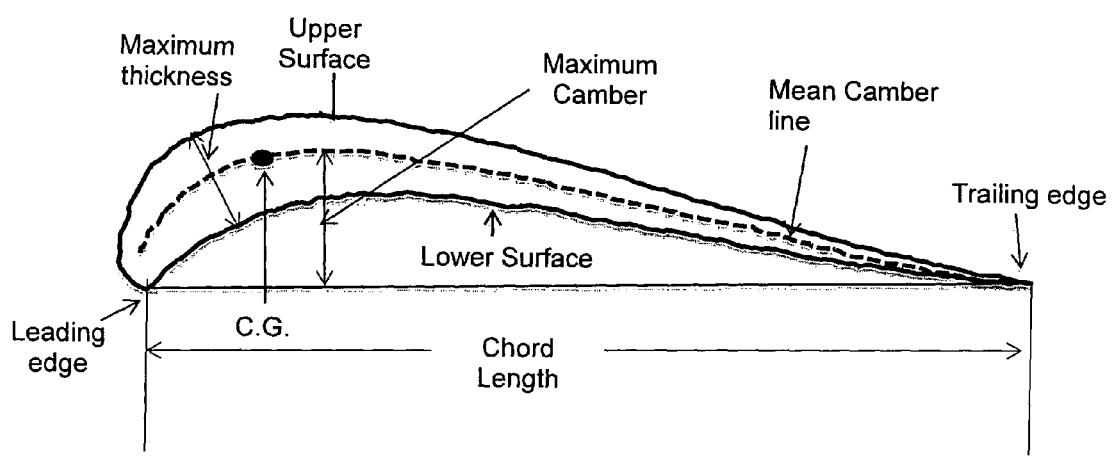
FIG. 4 is a cross sectional view showing the blade having the asymmetrical airfoil profile enclosed in this invention.

Similar to the upper hub, the lower hub 22, is also attached rigidly with the vertical rotating shaft. The distance between the upper and lower hub is determined by the length h of the blade as shown in FIG. 3. The dimension of lower hub may or may not be same as that of upper hub. The lower hub will support the lower set of horizontal channel beams. The spacing between two consecutive profiles s, (FIG. 3) is constant and its magnitude will be a design consideration. The chord length c, is the straight line distance between the leading and trailing edge. Standard method will be used to construct the blades. Once the blades are constructed, the c.g. (center of gravity) location will be determined. FIG. 4 shows the location of c.g. The vertical pin 53, passes through the c.g. of the blade section as shown in FIG. 3. The pin will be rigidly connected to the blade so that both the pin and the blade will rotate together without any slip along axis 21. The connection between the pin 53 and the horizontal beams 19 is fixed such that the angle between the horizontal beam 19 and the chord line c is fixed at 25.degree.

A number of highly aerodynamic blades 20, each connected to a set of upper and lower horizontal channel beams, 19 will constitute a system that will be responsible for generating lift forces. Blade-profile 50, is simple, asymmetrical with unequal upper and lower surfaces cambers, capable of generating high starting torque even at low wind. FIG. 4 shows a close up view of the profile illustrating various definitions related to the profile. Nomenclature used in FIG. 4 is for the purpose of this application. The leading edge 52, is the edge towards the wider end and the trailing edge 51, is towards the narrower end. In order to get higher lift force, the path difference between top and bottom surfaces should be as large as possible. In case of a wind turbine, when one blade is moving towards the wind, there is another that is moving away from the wind. In order to get highest lift force, it is the net force that is considered for the present application. In addition to path difference, there are many other factors that can influence as to how much lift force can be generated in a wind turbine. Two such factors are: (a) the ratio of maximum thickness to chord length of the blade-profile (refer to FIG. 4), and (b) path difference between chord length and bottom surface of the blade profile. The characteristics of the profile used in the current application are:

(i) path difference between upper and lower surfaces as % of chord length=20%

(ii) path difference between chord length and bottom surface as % of chord length=3%

(iii) Ratio of maximum thickness to chord length=11.5%

Figure 4A:
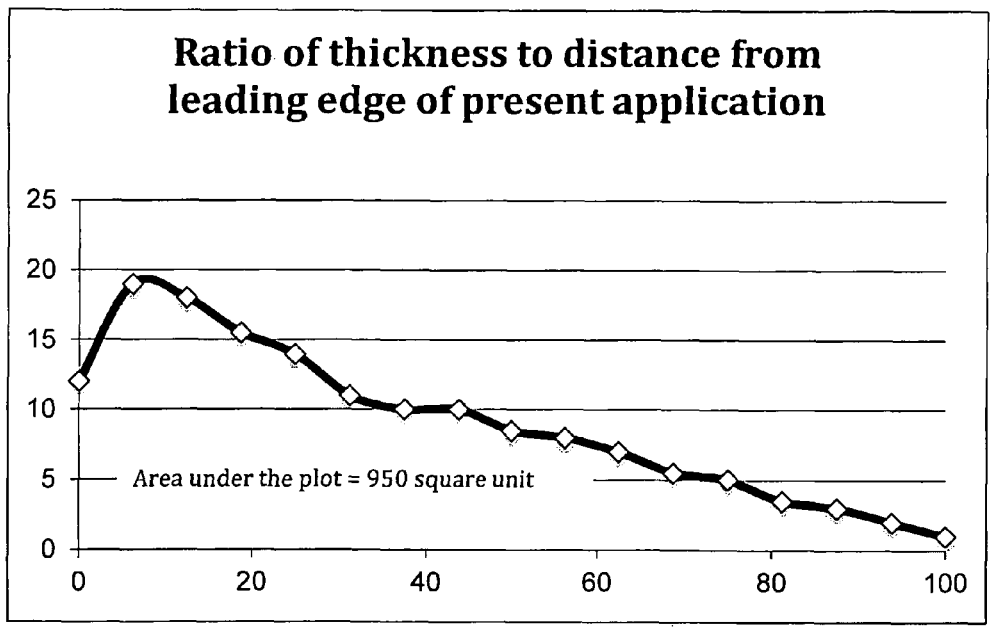
FIG. 4a gives how the ratio of airfoil profile thickness to distance from leading edge of the present application varies with distance from the leading edge.
Figure 4B:
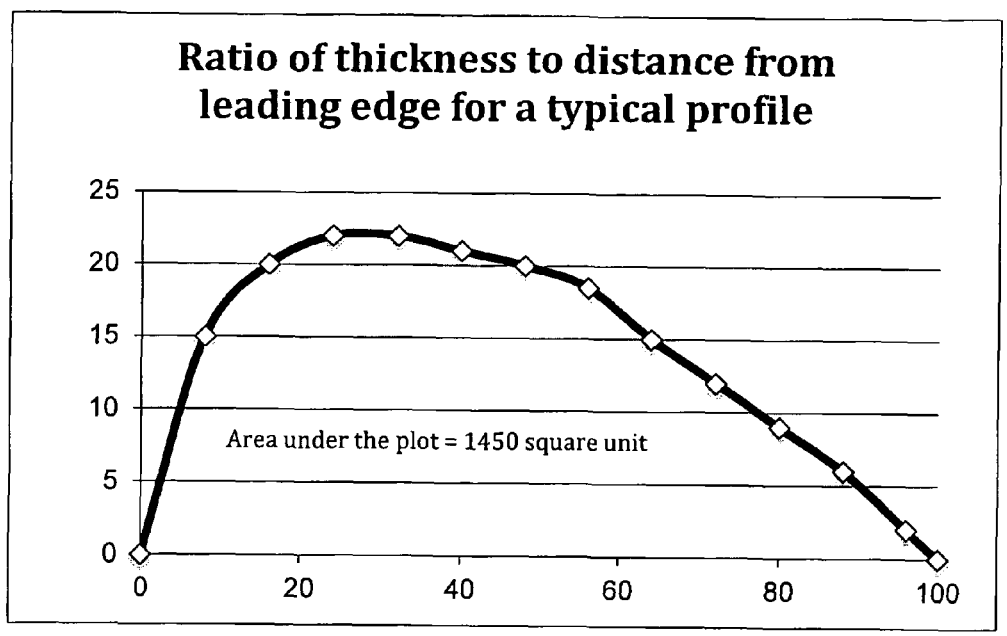
FIG. 4b gives how the ratio of airfoil profile thickness to distance from leading edge for a typical flat bottom profile varies with distance from the leading edge.

The example given at the end of this detailed description compares the profile of present application with a typical flat-bottom profile. Both the profiles have same path difference between upper and lower surfaces as 20% of the chord length. But the profile of this application has much lower value of the ratio of maximum thickness to chord length, as 11.5% compared to the same for the typical flat-bottom profile of 17.5%. FIGS. 4*a* and 4*b* are added here to illustrate how the thickness of the profiles changes along the length of the profile i.e. from leading edge to trailing edge. It is very clear from FIGS. 4*a* and 4*b* that the profile of present application is much better streamlined. The advantage of this streamline profile is demonstrated through a wind tunnel tests on blades. Areas under the curves in FIGS. 4*a* and 4*b* are proportional to the weight of the blades respectively. Area under the curve in FIG. 4*a* is measures at 950 square units and that for FIG. 4*b* is 1450 square units, a 54% increase. Thus, the blade made using present invention will be 54% lighter. A lighter blade will give rise to a lighter wind turbine. This will require the all-supporting structures lighter and thus more economical.

Figure 5:
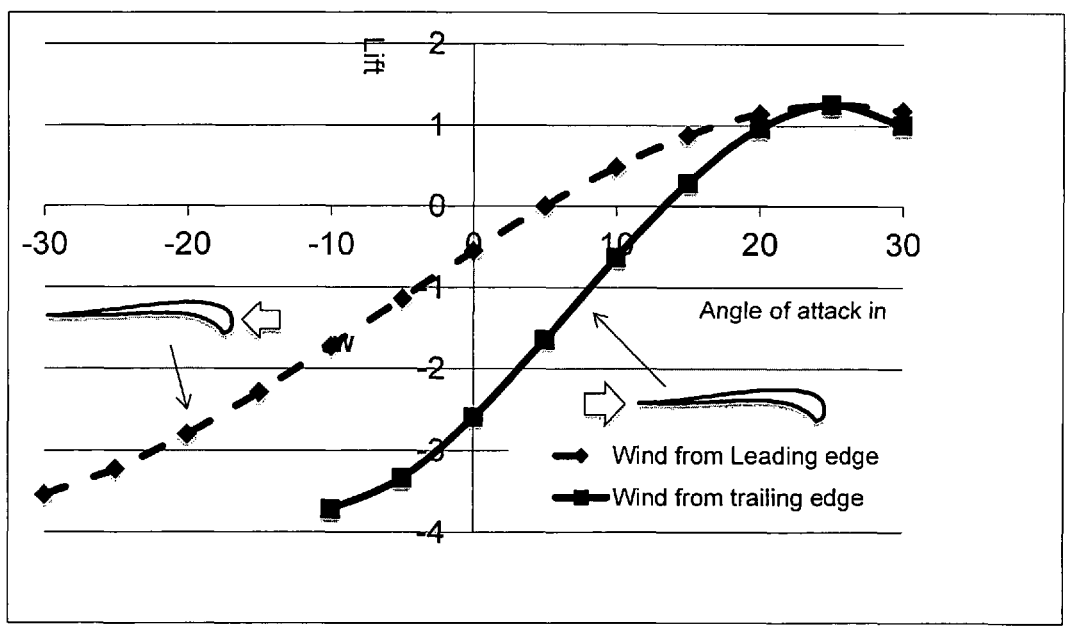
FIG. 5 shows the relation between lift coefficient and angle of attack based on observations from wind tunnel tests using blade made from the profile enclosed in the present application. The dotted curve corresponds to the case when wind blows from leading edge to trailing edge. The solid curve corresponds to the case when wind comes from the opposite direction.

Wind Tunnel: A 3.6 meter long, 0.36 meter square tunnel fitted with a 2-hp fan (that has eight blades that draws air at a speed of 13 meter/sec) is used to determine the proper orientation of the blades in order to yield high torque on a vertical axis wind turbine even at low wind speeds. This test determined the lift coefficients of blades at different angles of attack. The dimensionless coefficient of lift, $C_L$, is used to measure the effectiveness of the profile. Since lift force is linearly proportional to the lift co-efficient and power generation is proportional to lift force at constant rotation. Thus, in order to compare power generation effectiveness, it is similar to compare their lift forces or lift co-efficients. Data collected from the wind tunnel test was used to plot curves given in FIG. 5. Two curves are given: (a) the solid curve corresponds to the case when wind comes from the trailing edge and (b) the dotted curve for the case when wind comes from the leading edge. FIG. 5 shows that lift coefficient increases with the increase of angle of attack and attains maximum value when the angle of attack is around 25.degree. It is also observed that for this profile and at this wind speed, highest value reached for wind coming from front or back is almost the same.

The vertical rotating shaft with blades will be supported by two thrust bearings, 30. These thrust bearings will perform three tasks: (a) support the vertical rotating shaft from sideway movements while rotating, (b) allow free rotation of the shaft about its own axis, and (c) support self weight vertically. These bearings will be supported on base plates, 31, as shown in FIG. 2. The lower outer shaft, 28 will support the upper base plate. The lower thrust bearing will be supported on the lower base plate. It is important to make the connection between the lower base plate, 31 and lower outer shaft, 28 fixed using any effective fastening system. The lower base plate will be supported on a support structure, 32, which rest on the foundation 15, as shown in FIG. 2.

Figure 2E:
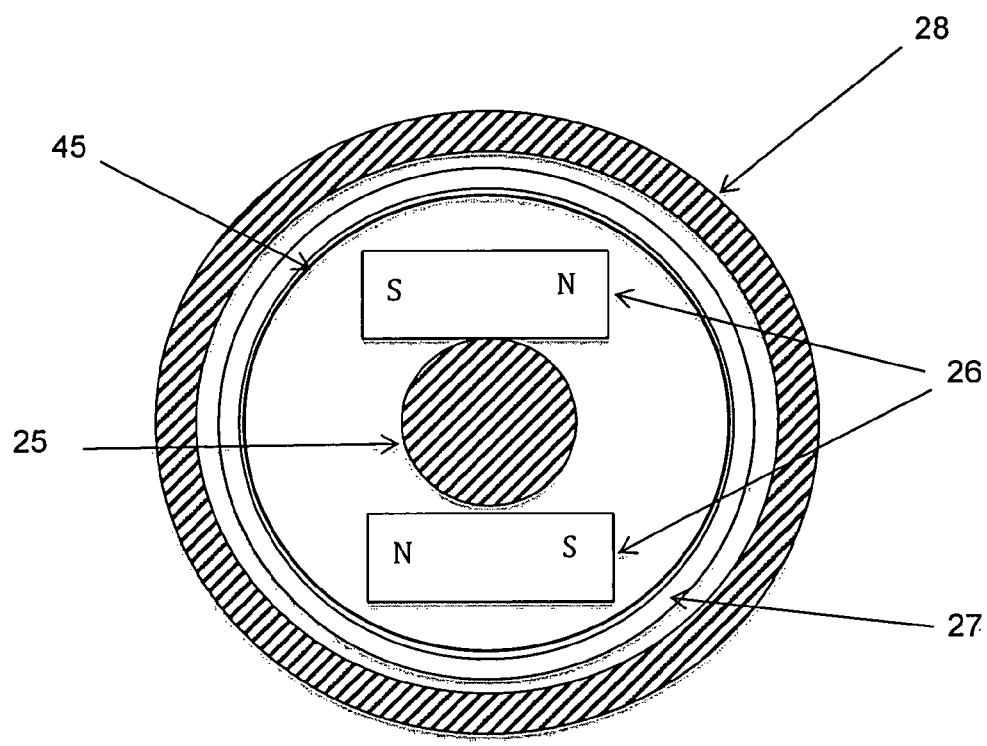
FIG. 2e is another sectional view of the vertical axis along E-E as shown in FIG. 2.

Copper wires will be wound helically around an insulated cylinder, 45 to form a coil, 27. The multitude of permanent magnets, 26 will be fixed on outer surface of the vertical rotating shaft between two base plates as shown in FIG. 2. FIG. 2e gives the cross sectional view along E-E as shown in FIG. 2. The coil, 27 along with the insulated cylinder 45, will be placed between the magnets and the lower outer shaft. The terminals of the copper wire will be connected to a power storage device such as a battery, 14 as shown in FIG. 2.

4. How to Use the Invention

The vertical axis wind turbine of the present application is able to harness power even when the wind is very slow. When wind strikes in the turbine, there are two sources where thrust forces will be generated: (a) by the blades due to unequal pressure along the surfaces of the blades creating lift force that turns the hubs connected to the blades and (b) the wind that will get trapped in the compartments of the horizontal beams, 19, will generate thrust that will give rise to torque about the axis of the vertical rotating shaft. As a result, the vertical rotating shaft will spin about its own axis. The magnets, which are mounted on this shaft, will also spin. As a result, there will be changes in the magnetic environment of the coil of wire. A voltage will be induced in the coil that will generate current and thus electric power. The induced voltage in the coil is proportional to the rate of change of magnetic flux times the number of turns in the coil.

To summarize, present application deals with a hybrid vertical axis wind turbine using a highly aerodynamic blade-profile and a horizontal beam with compartments, together will be capable of providing high starting torque even at low wind. The blade-profile is simple to construct, asymmetrical with unequal upper and lower surface cambers. Other characteristics of this profile are that it is compact, lightweight, durable and economical. Wind tunnel tests demonstrated that this aerodynamic profile would generate high torque of similar magnitude when wind comes from leading or trailing edge directions. The example given below demonstrates that the present profile will generate 2.5 times the thrust than that by a typical profile. The primary target users will be 44% of the world population that live in rural areas where roof-top wind turbine will be cost effective to provide enough household required electric power. This compact turbine can also use batteries to store energy, thereby reducing and possibly eliminating the need for grid power.

5. Example of the Invention

Figure 6:
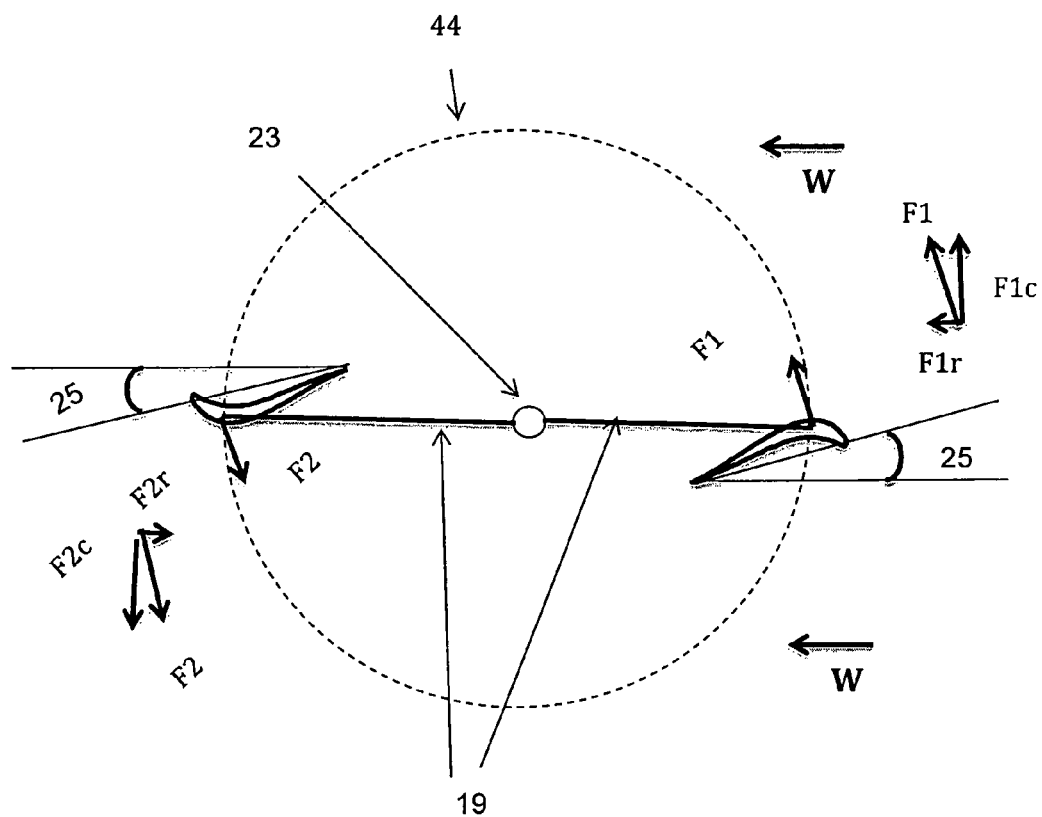
FIG. 6 is a view showing the arrangement of two airfoil blade-profiles with respect to the connecting beams. Lift forces acting on the blades at two locations are also shown.

FIG. 6 shows a two-blade turbine with blades mounted at an angle 25 degree. The figure also shows the lift forces that will be generated due to wind. The lift force is resolved into two components: one along the circumference 44, and the other along radial direction. It is the circumferential component that will be responsible for generating the torque about the axis of the turbine. F1 is the lift force generated on blade 20. F1c is the circumferential component and F1r is the radial component.

FIG. 5 gives two plots based on wind tunnel test observations. One curve (solid line) corresponds to the case when wind comes from trailing end towards leading end. It is clear from the plots that when the angle of attack is around 25.degree., both the blades create maximum lift forces. The equations of the best-fit curves, as shown in FIG. 5, can be given as:

$$C_L = -4E(-05)x^3 - 0.0007x^2 + 0.1146x - 0.5486 \text{ for dotted line and}$$

$$C_L = -0.0002x^3 + 0.0042x^2 + 0.1739x - 2.5933 \text{ for the solid line.}$$

Where x is the angle of attack in degree.

Wind tunnel test was performed at a speed of 13 mph. The angle between the wind direction and the horizontal channel beam 19, is 0.degree.

For present profile: F1c.varies.1.1342 and F2c.varies.1.1342. Total net force in the circumferential direction is .varies.2.2702 and for typical flat-bottom profile: F1c.varies.0.185 and F2c.varies.0.723. Total net circumferential force .varies.0.908. Thus, the net force for the present profile will be 2.2702/0.908=2.5 times than that for the typical flat-bottom profile.

In conclusion, the efficiency of the current profile is very distinct. The torque generated by the lift force using profile of present invention will be 2.5 times than that generated by a typical flat-bottom profile. The profile of present application is 54% lighter and thus, will be economical and thus, will be able to generate much higher starting torque.

The invention claimed is:

1. A hybrid vertical axis wind turbine structure comprising: a vertical rotating shaft at the center of the turbine; an upper hub and a lower hub to accept a set of upper horizontal beams and a set of lower horizontal beams at one end of the horizontal beams wherein the horizontal beams are formed in the shape of a semi-circular hollowed cylinder to capture wind; multiple blades each connected to the ends of the upper horizontal beam and the lower horizontal beam on the opposite end of the horizontal beams connecting to the hubs; a near end of the horizontal beam defined as the end connecting the beam to the hubs, and a far end of the horizontal beam defined as the end connecting the beam to the blades; an upper outer shaft to protect the vertical rotating shaft placed between the hubs; an upper thrust bearing supported on an upper base-plate placed below the lower hub; a lower outer shaft to protect the rotating shaft placed below the lower hub; a plurality of magnets that are fixed on an outer surface of the vertical rotating shaft between the upper base plate and lower base-plate; a plurality of copper wire coils wound helically on an insulated cylinder and connected to a power storage device at a foundation; a lower thrust bearing supported on the lower base-plate; and wherein a blade profile has a leading edge and a trailing edge and a cross-section that is highly aerodynamic defined as; (i) a path difference between an upper surface and a lower surface as a percentage of a chord length of 20%, (ii) a path difference between the chord length and the lower surface as a percentage of chord length of 3%, and (iii) a ratio of maximum thickness to the chord length of 11.5%.

2. The hybrid vertical axis wind turbine according to claim 1, wherein the vertical rotating shaft is connected rigidly with the upper hub and the lower hub.

3. The hybrid vertical axis wind turbine according to claim 1, wherein the upper hub and the lower hub are connected rigidly with the near end of upper horizontal beams and near end of the lower horizontal beams.

4. The hybrid vertical axis wind turbine according to claim 1, wherein each blade is connected rigidly with the far end of the upper horizontal beams and the far end of the lower horizontal beams.

5. The hybrid vertical axis wind turbine according to claim 1, wherein the angle between the blade chords line and the horizontal beam is fixed at 25 degrees.

6. The hybrid vertical axis wind turbine according to claim 1, wherein the lower outer shaft is static and is supported on the lower base-plate.

7. A method for producing electricity using a hybrid vertical axis wind turbine, comprising the steps of: mounting a vertical rotating shaft and connecting the vertical shaft with a building frame-work; fixing an upper hub and a lower hub with the vertical rotating shaft; fixing an upper horizontal beam and a lower horizontal beam with the upper hub and the lower hub at a near end and to a blade at a far end and wherein the horizontal beams are formed in the shape of a semi-circular hollowed cylinder to capture wind; the near end of the horizontal beam defined as the end connecting the beams to the hubs, and the far end of the horizontal beam defined as the end connecting the beams to the blades; mounting the blades between the upper horizontal beam and the lower horizontal beam; placing an upper thrust bearing around the vertical rotating shaft between the lower hub and an upper base-plate; fixing a plurality of magnets rigidly on the vertical rotating shaft; placing a lower thrust bearing around the vertical rotating shaft on top of a lower base-plate; winding a copper coil on an outer surface of an insulated cylinder; placing the insulated cylinder on the lower base-plate; placing a lower outer-shaft around the insulated cylinder and fixing the lower outer-shaft on the lower base-plate rigidly; and connecting the ends of the copper coil with two terminals of a battery or any power storage device.

8. The method according to claim 7, wherein said step of mounting the vertical rotating shaft and connecting with the building frame-work is configured such that the vertical rotating shaft remains stable and is free to rotate.

9. The method according to claim 7, wherein fixing the horizontal beams with the hubs at the near end is done so that the horizontal beams can transmit a torque to the hubs.

10. The method according to claim 7, wherein said step of mounting the blades between the upper horizontal beam and lower horizontal beam such that an angle between the blade-chords and horizontal beams is fixed at 25 degrees to generate a highest amount of torque.

11. The hybrid vertical axis wind turbine according to claim 1, wherein each horizontal beam has two faces, a streamline profile facing the leading edge of the blade, and a channel-shape facing the trailing edge.

12. The hybrid vertical axis wind turbine according to claim 1, wherein the lower base-plate is supported directly on a foundation or on a plurality of columns.

* * * * *